United States Patent [19]

Stevens

[11] Patent Number: 5,737,209
[45] Date of Patent: Apr. 7, 1998

[54] POWER QUALITY AND DEMAND MANAGEMENT MODULE

[76] Inventor: Carlile Stevens, P.O. Box 8784, Horseshoe Bay, Tex. 78654

[21] Appl. No.: 751,966

[22] Filed: Oct. 16, 1996

[51] Int. Cl.$^6$ ............................... H02M 7/04; H02J 1/12; H02J 7/00
[52] U.S. Cl. ................ 363/143; 307/46; 307/64
[58] Field of Search ........................ 307/46, 64, 66, 307/48; 323/222; 363/143

[56] References Cited

U.S. PATENT DOCUMENTS

| | | | |
|---|---|---|---|
| 4,634,888 | 1/1987 | Deavenport | 307/66 |
| 4,642,475 | 2/1987 | Fischer et al. | 307/66 |
| 4,728,808 | 3/1988 | Bet-Esh et al. | 307/66 |
| 4,920,307 | 4/1990 | Iketani | 320/28 |
| 4,935,861 | 6/1990 | Johnson et al. | 363/132 |
| 5,184,025 | 2/1993 | McCurry et al. | 363/65 |
| 5,185,536 | 2/1993 | Johnson, Jr. et al. | 307/66 |
| 5,241,217 | 8/1993 | Severinsky | 307/64 |
| 5,287,263 | 2/1994 | Shilo | 363/143 |
| 5,426,579 | 6/1995 | Paul et al. | 363/126 |

*Primary Examiner*—Peter S. Wong
*Assistant Examiner*—Bao Q. Vu

[57] ABSTRACT

A device that may be inserted into a power cord or power distribution system prior to a computer, monitor or like devices for correcting the inherently bad power quality of such devices and for eliminating the losses and damage to and within the power distribution system. The device can also provide a unique low cost method of supplying uninterruptable power to said electronic equipment. This uninterruptable power supply (UPS) is continuously active and limits may be set to limit the peak demand drawn from said power distribution system to an amount slightly above the average power consumed by the electronic equipment to which it is connected. The demand may also be controlled in response to directions of an energy management system. The concepts disclosed may also be incorporated directly into the power supply of any electronic device to achieve high power quality and peak demand control.

14 Claims, 4 Drawing Sheets

FIGURE 1

PRIOR ART

POWER QUALITY AND DEMAND MANAGEMENT MODULE

BACKGROUND OF THE INVENTION

1. Field of the Invention

The present invention relates to apparatus and method of controlling the peak demand of electrical equipment connected to a power supply or distribution system (Power Grid) as well as providing an uninterruptable poser supply (UPS) to the same electrical equipment in the event of a temporary failure of the power supply or distribution system. At the same time, the invention assures that the load on the power distribution system will have a high power factor and low harmonic distortion (High Power Quality).

2. Description of Prior Art

Virtually all of the electronic equipment in the market place today, including such items as computers, monitors, TV sets, microwave ovens, printers, copy machines, and the like, employ loads which draw power from the power supply or distribution grid in a manner which is extremely detrimental to the effectiveness of said distribution grid. This is because all electronic equipment ultimately operates on direct current of one voltage or another, therefore the AC line voltage and current must be rectified and filtered before anything else can occur. The most common method of doing this employs a diode bridge followed by a large storage capacitor. With this method current flows from the AC line only when the AC line voltage is at the peak of its cycle (see FIG. 2) causing high current spikes. These high current spikes occurring on each positive and negative half cycle of the AC line frequency cause a very low power factor typically between 0.4 and 0.6, generate odd harmonics of the line frequency and cause a high input current crest factor. High current crest factor and harmonics from electrical equipment such as televisions and microwave ovens have not been a problem up to now because of the small percentage of power consumed by these devices. However, with the computer revolution and the advent of the all electronic home, this problem has become severe.

Power factor may be defined as a method of measuring delivery efficiency, thus a low power factor means that the power company must handle more power than it can bill for, resulting in higher distribution expenses for which they will not be reimbursed by the customer. In the past poor power factor had been caused by motor and other inductive types of loads. The power company has corrected for these loads by adding power factor correction capacitors across the power line at the central distribution point. Unfortunately electronic loads draw their power in such a manner that the addition of these capacitors lowers the line impedance which allows for even higher peak currents between the capacitors, at the central distribution point, and the customer's power consuming device. If the distribution transformer is between the capacitors and the power consuming device, as is often the case, it will get considerably hotter and may over heat in many cases. Thus the old method of adding capacitors, besides not being effective in correcting this type of power factor problem, will greatly increase the current crest factor and power line harmonics with their associated problems.

The problems thus caused are difficult and almost impossible to solve at the power company level other than by increasing the size of the distribution wiring and/or distribution transformer. This is an expensive procedure and very impractical in prewired installations. With the office environment now having progressed to one computer terminal for every two employees and soon expected to reach one terminal for each employee, the amount of poor power quality being drawn has reached a level where there have been known fires caused by excessive neutral current in three phase systems. The total harmonics generated by most of the presently installed electronic equipment is typically 110%–150% of the fundamental frequency current drawn by such equipment. When the harmonic content is more than 100% it means that there are more harmonics on the line than the fundamental line frequency. The national electrical code requires that the neutral current in a "Y" connected three phase system never exceed the current in any one leg. To accomplish this the total harmonics must be held below 33% and even that assumes a totally balanced distribution system with the same power drawn on each 3 phase leg, which is rare and unlikely. With harmonics ranging in the 100+ percentages it is easy to see that this is a problem that must be solved. The level of harmonics, crest factor and power factor is now being referred to in the trade as "Power Quality".

The prior art methods, when used, for obtaining high power quality (correcting power factor and high harmonics while lowering current crest factor) from within the energy consuming device fall into two categories; active and passive. The passive method involves the addition of fairly large bulky low frequency inductors and resonating capacitors which reduce the crest factor and filter out the harmonics. The size and expense of these devices have made them impractical except in those areas where regulations have been mandated by government agencies requiring power factors above 0.9, such as with electronic lighting ballasts. Even here the regulations only apply to power factor, not to harmonics or crest factor and thus most of these devices generate unacceptable harmonics, though not as bad as the unfiltered devices. The active methods use some form of high frequency switching device in combination with smaller inductors and capacitors, to correct the power quality. Refer to this inventors U.S. Pat. No. 4,277,728, issued in 1981, one of the first patents for correcting power quality, long before the industry had recognized it as a severe problem. These active devices are incorporated within the power supply of the particular device involved, most particularly in the electronic fluorescent ballast industry due to the regulations issued there. This inventor knows of no prior art involving a device that is inserted externally to power consuming equipment for the correction of all aspects of power quality.

There is also a serious problem confronting the electric utility industry where virtually no more power generation plants are coming on line due to the more and more complex environmental regulations. Many nuclear plants face the possibility of shutdown because of age, new safety regulations or environmental problems. Thus, the electric utilities are forced to harvest the new energy needed for the ever expanding economy from existing energy users through conservation and peak demand control. Peak demand control relates to the fact that most electrical energy user requirements vary widely over time. The peak energy requirement may be up to three, four or more times the average requirement. The utility must have the generating capacity and larger distribution system on line to supply this peak demand at all times even though it can charge only for the power used. The installation of equipment that manages the peak demand by supplying energy for the short time needed from alternate sources frees up valuable capacity that can be used to supply others. To this inventors knowledge there is no prior art relative to controlling peak demand with the method disclosed herein.

There is abundant prior art relative to uninterruptable power supplies (UPS) used to supply power when the line power fails. The UPS prior art can be broken into two types, switched and continuous. In the switched variety the power from the power grid is monitored and when it fails the UPS immediately switches to a battery driven replacement power source. This method requires a time delay, however small, between the time of the sensing of the power grid failure and the application of the standby power. With the continuous type of UPS, the current from the power grid is first rectified and used to charge a standby battery. The output of the battery is then continuously converted to the equivalent of the power supplied by the power distribution system. The charging circuit supplies both the power to the converting portion of the supply as well as the power required to charge the batteries. In the event the input power fails the batteries are already on the line and there is no interruption of the power supplied to the attached electrical device. The invention herein is a combination of these two that has the advantages of being off-line without the switching delay as will be discussed later.

Primarily the prior art involves a switching converter of some variety which takes the DC from the standby battery and converts it to the AC equivalent the electrical device is used to seeing directly from the power grid, typically 120 volts, 60 Hz. In virtually all cases of prior art the UPS devices are known to have extremely poor power quality in their use of power grid energy. A battery charging circuit typically draws current in the same manner as the present power supplies discussed above, as shown in FIG. 2, at the peak of the power line voltage cycle only. In cases where the customer desires better power quality and can afford it, this poor power quality is normally corrected by the addition of large, heavy and expensive filtering elements.

3. Object of the Invention

The objectives of the present invention are to provide an insertable device between the power grid source of electrical energy and the electrical energy consuming device wherein the following objects may be accomplished:

a. The energy demand of the electrical energy consuming device is held to its average demand eliminating the requirement of the power grid to provide for the peak power needs of the device.

b. Uninterruptable power is provided in the event of power grid failure.

c. No harmonics of the power line frequency are reflected back onto the power line as the result of energy consumption.

d. The power factor of the load on the power line is held at or near unity.

e. The current crest factor is at or near 1.414, as for a sine wave.

f. All components are light weight, small in size and inexpensive, with the exception of the battery which must be sized to the application and the length of time uninterruptable power is needed.

Another object of the present invention is to accomplish all objects a. through f. above, if desired, by including the inventive circuitry within or as part of the power supply included with or mounted within an energy consuming electrical device.

A final object of the present invention is to accomplish all of the listed objects in such a manner as to improve the total energy conversion efficiency

SUMMARY OF THE INVENTION

These and other objectives are achieved in accordance with the present invention by inserting a module between the power source and the power or energy using device which corrects the power quality and results in current being drawn from the line in phase with the voltage and at an amplitude equivalent to a near perfect power factor of 0.98+(1.0 is perfect) and total harmonics in the range of 10% of the fundamental line current. In addition, the module may or may not include the ability to supply uninterruptable power if batteries are included and/or manage the peak energy demand requirement of power to the connected electrical device. The subject invention is a small, low cost, unobtrusive module of the active filter nature which may be inserted between the electrical device and its power source, typically the wall plug. It may be mounted as a small box in the power cord leading to the electrical equipment or be inserted in a power strip which distributes power to equipment such as computers, monitors, printers, etc. A third option is to allow the insertion of the device into an existing power supply by opening the chassis, severing a few connections and inserting it therein. A fourth option is to supply a complete replacement or OEM power supply that incorporates some or all of the features of the herein disclosed invention.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description taken in connection with the accompanying drawings in which:

DESCRIPTION OF THE PREFERRED EMBODIMENT

Figure 1:
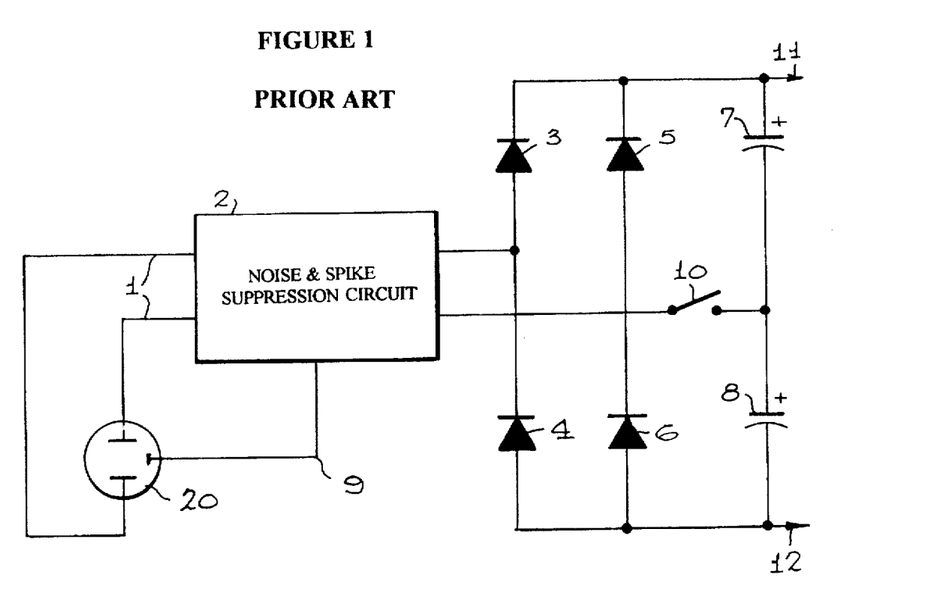
FIG. 1 shows the typical input section of a computer or electronic equipment power supply for reference and understanding of how the subject invention functions.

In order to understand the operation of the preferred embodiment, it is first necessary to discuss the input section of a computer power supply, as used in this example. As shown in FIG. 1, the line power enters at connections 1, noise and spikes are suppressed with a variety of public domain types of circuitry included in box 2. The noise suppressed line voltage is presented to a bridge rectifier comprising diodes 3, 4, 5 and 6. The output of the bridge rectifier is filtered by capacitors 7 and 8, connected in series across said bridge. Switch 10 is employed to convert the circuit from a bridge to a voltage doubler and thus provides for either 110 or 220 volt operation. For 110 volt operation switch 10 is closed and diodes 5 and 6 are essentially non operative. When the line input voltage is above the voltage of capacitor 7, diode 3 conducts positive current to capacitor 7 and the load connected at 11. This results in a voltage equal to the line peak on capacitor 7. In a like manner, diode 4 places a negative voltage equal to the line peak across capacitor 8, thus the voltage across the combined capacitors 7 and 8 equals twice that of the peak line. For 220 volt operation, switch 10 is open and diodes 3–6 operate as a bridge producing the peak line voltage across 7 and 8. Thus, the voltage is approximately the same as for 120 volt operation when the doubler was created by closing switch 10. The high voltage DC is presented to the balance of the power supply via connections 11 and 12.

It is immediately apparent, when reviewing FIG. 1, that DC power, of either polarity, entering at the line power input will present itself at 11 and 12 as long as switch 10 is open. A positive voltage will appear at 11 with a negative voltage return at 12 regardless of the polarity of the input. The subject invention, as will be described in more detail shortly, supplies DC power, rather that AC power, to the input of the conventional power supply and then utilizes the filtering capabilities of the capacitors 7 and 8 which are invariably present. Thus, when the subject invention is employed, diodes 3–6 are not required for functionality of the circuit, if proper polarity is observed, but are present whenever a conventional prebuilt power supply is being used. The fact that the diodes are there has the additional advantage of making it unimportant to maintain polarity of the input voltage.

Figure 2:
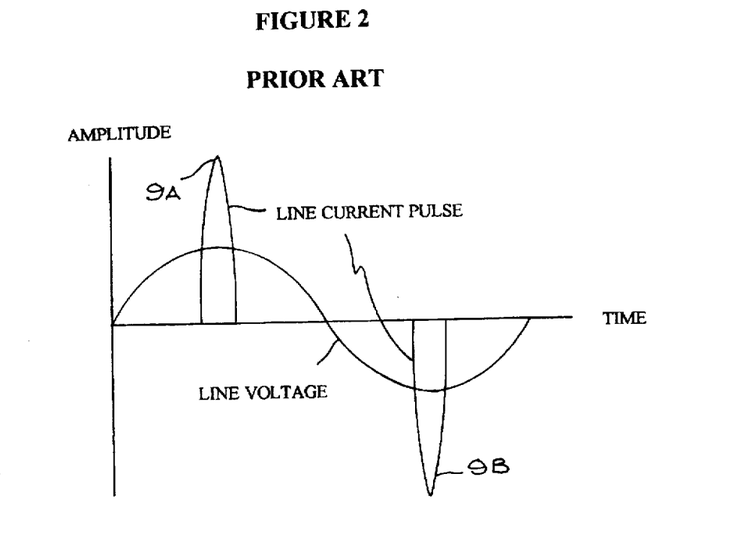
FIG. 2 shows the typical line voltage and current wave form of today's office equipment including computers, printers and monitors as well as home TV sets and microwave ovens.

FIG. 2 shows the voltage and current wave form measured at the input lines 1, in FIG. 1 of the conventional power supply. As discussed above current does not flow until the line voltage exceeds the voltage on capacitor 7 or 8 depending on which half cycle. Therefore, current only flows at the peak of the line voltage cycle. It is this high current spike 9A, that causes the poor power factor, high current crest factor and high harmonic content of the current draw on the input power line.

Figure 3:
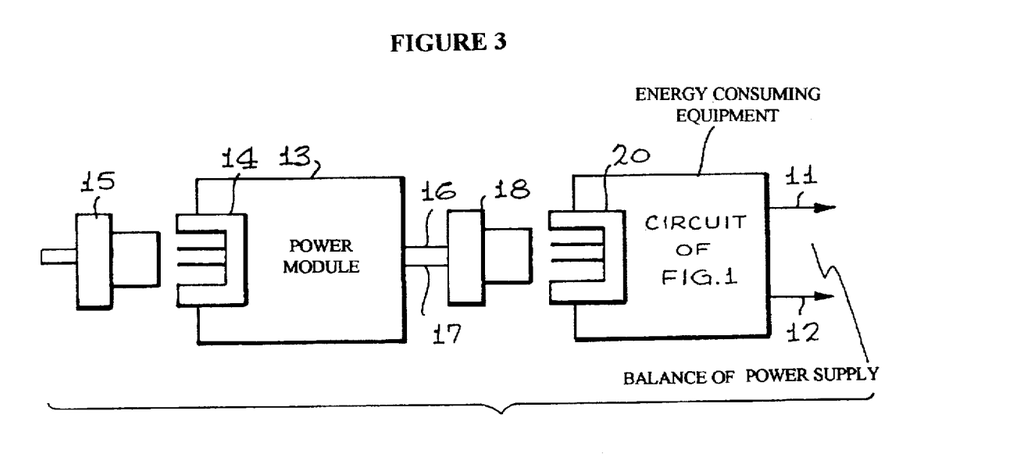
FIG. 3 is a block diagram depicting one of the methods the subject invention is connected to an electrical appliance.

Referring now to FIG. 3, the module 13 of the subject invention is connected to the power line via a line cord and plug via connectors 14 and 15 and, in turn, is itself connected to a computer power supply via line 16 and 17 and plug 18. Male receptacle 20 is the standard receptacle present on office equipment, computers, etc., as shown in FIG. 1.

Figure 4:
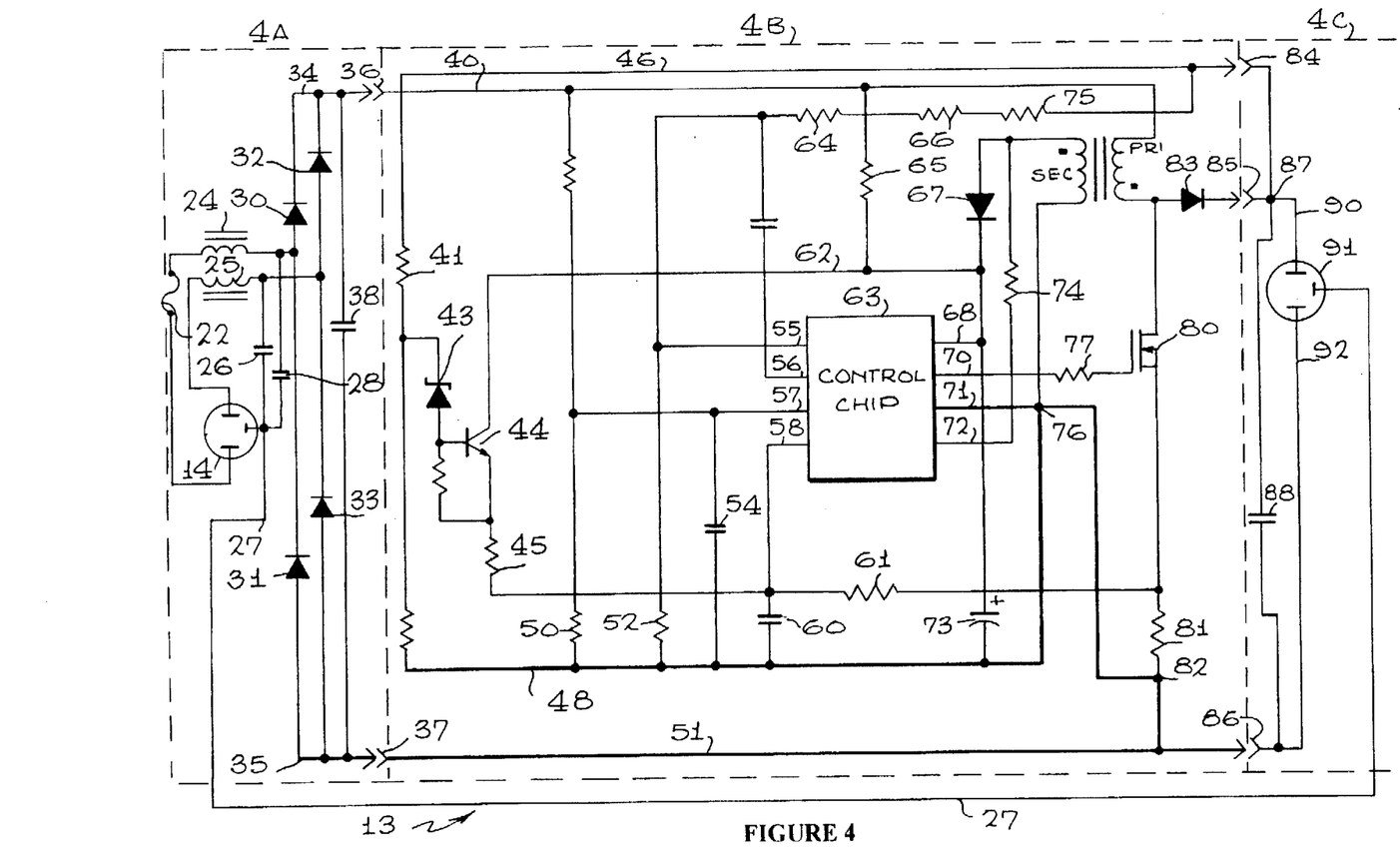
FIG. 4 is a schematic diagram of the internal assembly of one or more of the blocks shown in FIG. 5.

The functional operation of the inventive module 13 can be best understood by referring to FIG. 4. Line power enters at receptacle 14 and is protected from short circuit by fuse 22. Inductors 24 and 25 serve to both protect the device from line transients as well as to establish a line impedance for the active filter network to create the appropriate high power quality line loading, as will be discussed shortly. Capacitors 26 and 28 function to conduct any internal current spikes generated by the circuit to earth or back to the other side of the line rather than allow them to go on the line, either in the normal or common mode.

Diodes 30, 31, 32 and 33 form a bridge rectifier that presents the full wave unfiltered rectified DC voltage at lines 34 and 35. The capacitor 38 is also connected across these points but is not large enough to perform any filtering function at the line frequency but rather is a by pass for the high frequency generated by the conversion section. It also serves as a low impedance load for filter inductors 24 and 25 to reduce any line transients from entering the circuit. The dotted outline area labeled 4B is delineated because this circuit is used twice in the full embodiment of the present invention. Input connections are made at points 36 and 37, output at points 85 and 86 and feedback at point 84. How connections are implemented can be seen by referring to FIG. 5 which will be discussed in more detail below.

The pulsating DC from the input bridge rectifier is conducted on line 40 to inductor 78, although shown as a transformer, the primary function of 78 is to act as a boost inductor in conjunction with the switching of FET 80. The secondary of inductor 78 is used to supply logic power to the drive circuitry and also indicates when it is time to turn FET 80 "on", as will be discussed. For the purpose of this discussion control chip 63 is a Motorola MC 34261 although there are other devices on the market which will accomplish the same functionality discussed here with minor variations in component value selection and placement in the circuit. When power is first applied, capacitor 73 is charged from line 40 though resister 65. This supplies operating power to the control chip at point 68. The control chip 63 is designed such that it does not draw any current until capacitor 73 has reached a predetermined voltage. This allows resistor 65 to be of a high value and low wattage as the operating power for the chip is not derived through it. Once capacitor 73 is charged high enough to maintain operation, switching is commenced allowing the secondary of inductor 78 to supply operating power through diode 67 to capacitor 73 and other portions of the circuit.

When switching commences FET 80 is turned "on" by a drive signal from the control chip at output 70 through resistor 77 to its gate. Current commences to flow through the primary of inductor 78 and FET 80 and current sense resistor 81 to circuit common. As the current increases the voltage drop across resister 81 increases proportionally and this voltage drop is fed through resistor 61 to input 58 of the control chip 63. Resistor 61 and capacitor 60 serve as a noise filter to eliminate false switching. When the input at point 58 reaches the appropriate level the chip turns "off" FET 80. When FET 80 turns off the stored energy in inductor 78 causes the voltage at the drain of FET 80 to rise until diode 83 is forward biased conducting current into capacitor 88. It is necessary, for this circuit to operate properly, that the voltage on capacitor 88 always be higher than the peak input line voltage. When the drain voltage of FET 80 rises to the voltage at point 87, the secondary of inductor 78 also goes positive with respect to circuit common by a high enough voltage to supply logic power. This voltage is also presented through resistor 74 to input 72 of control chip 63. Control chip 63 uses this input to know when the stored energy of inductor 78 has completely discharged through diode 83. Once the energy in inductor 78 is exhausted, the voltage at the drain of FET 80 will fall. The voltage therefor on the secondary will also fall and the control chip will sense it is time to turn FET 80 to the "on" conduction mode again.

The output voltage at point 87 is fed back through point 84 to line 46 which connects to resistors 64, 66, 75, connected in series, as part of a voltage divider which includes resistor 52. This divided down voltage is proportional to the output voltage and is presented at input 55 of the control chip 63. Sensing this voltage the control chip can set the amount of allowable peak current in FET 80 and thus control the output voltage at point 87. Input 55 of control chip 63 is internally connected to an operational amplifier, the output of that amplifier is connected to output 56. Capacitor 53 is connected between input 55 and output 56 and is selected to make the circuit non responsive to the unfiltered DC supply line frequency voltage fluctuation. The voltage divider consisting of resisters 47 and 50 presents a voltage at input 57 proportional to the unfiltered AC line voltage on line 40. This accomplishes two things, first it allows the control chip to tailor the switching operation so that the average current drop from the power line is proportional to the voltage and thus a unity power factor is maintained. Second since the line voltage can vary from 95 to 260 volts, the chip can adjust the switching current to maintain unity power factor over this full range.

Transistor 44 and its associated components serve to detect when there is no load on the power supply. Under the light or no load conditions, the normal feedback cannot hold the output voltage and it will continue to rise until the voltage divider comprising resisters 41 and 42 obtain a voltage at their junction which forward biases zener diode 43 causing transistor 44 to conduct. When transistor 44 conducts it lowers the amount of voltage required across current sense resistor 81 to cause the chip to turn off FET 80. This reduces the switching current to near zero and allows switching to continue just enough to supply power to the secondary of inductor 78 and diode 67 to keep the circuit operational.

Figures 5, 6:
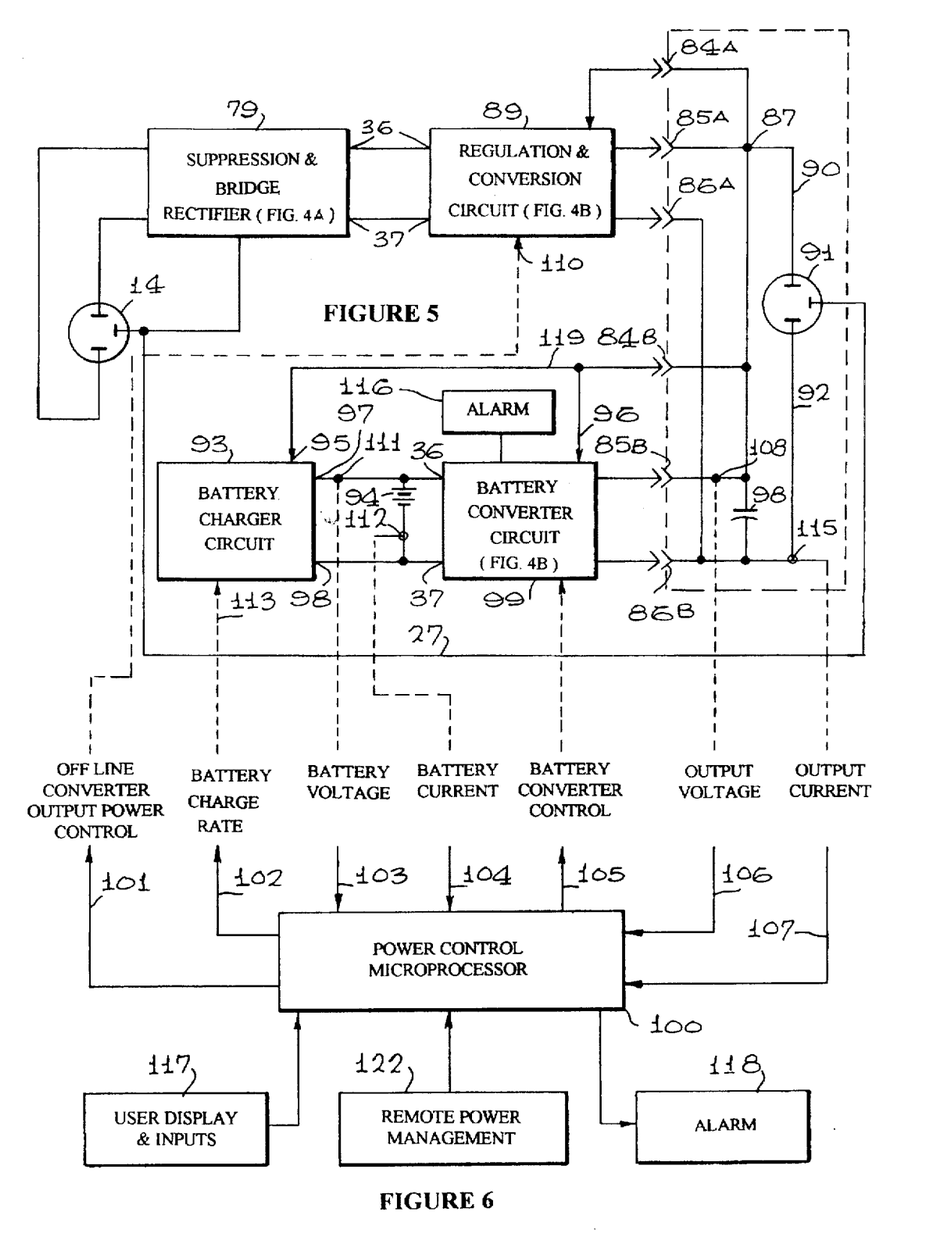
FIG. 5 is a block/schematic representation of a preferred embodiment of the subject invention.
FIG. 6 is an extension of FIG. 5 with a microprocessor added to increase its response, effectiveness and versatility.

When the circuit 4 B is used as the battery converter, as in box 99 of FIG. 5, the values of resistors of 41 and 42 are adjusted such that when the output voltage at 87 is at the normal off line converter output voltage the battery converter is held "off".

Turning to FIG. 5, it can be seen that battery 94 is connected at the same points 36 and 37 of circuit 99 as the suppression and bridge rectifier 79 are connected to the off line converter section 89. The outputs 85A and 85B are connected together to maintain the voltage on capacitor 88, point 87 and output plug 91. In all cases line 27 connects the earth input and the output together. When the demand control ability of the subject invention is implemented the resister values of the off line converter section of FIG. 4 including most particularly the current sense resistor 81, are adjusted to limit the amount of power the circuit will deliver at output 85A. When more than the preset amount of power is drawn from the off line converter the voltage at point 81 drops slightly causing the battery converter to activate and supply what additional power is needed by turning off transistor 44.

It can be further seen that as an extreme case, when there is no power being supplied by the off line converter, the battery converter will supply all of the power thus uninterruptable power supply UPS action is instituted without any switch over requirement. The battery charger 93 is also connected to the output voltage at point 95 via line 119 from feedback connection 84B. By monitoring the feedback voltage, the battery charger can monitor the point at which the battery converter is working or when it ceases to draw power. When the load is light, the output voltage rises to the point that the battery converter shuts off and the battery charger will draw what ever power it can up the output limit of the off line converter to recharge the battery.

FIG. 6 shows a further enhancement of the inventive device employing a microprocessor 100 to manage the actual power demand control. Each input and output of the power control microprocessor is labeled. These are also shown in dotted lines connected into FIG. 5 at the appropriate locations. Although the circuit of FIG. 5 will work as a stand alone circuit as described above, its operation may be enhanced by the intelligence of a microprocessor controller. Specifically the power drawn by the output of the off line converter adjusted to output of the off line converter adjusted to this average plus whatever additional amount is needed to keep the battery charged. Additionally, charge on the battery may be monitored to adjust the maximum output limit of the off line converter to provide adequate power to keep the battery charged or, in the alternative, sound an alarm to the user indicating that inadequate battery power is available for UPS operation.

To accomplish the above, output current is sensed at the current sense point 115 and fed back via line 107 to microprocessor 100. The value of the output voltage is fed back by line 106 to the microprocessor, allowing the microprocessor to monitor both output voltage and current, thus output power. The battery voltage sensed at point 111 and fed back to the microprocessor on line 103, while its current is sensed at current sense point 112 and fed back to the microprocessor on line 104. These four inputs give the microprocessor the input data information it needs to operate optimally. The microprocessor output is connected to the off-line converter 89 via line 101 to input 110 which adjusts the maximum wattage the converter will be allowed to deliver, see line 120 of FIG. 7.

The battery charge rate output on line 102 controls the battery charger through input 113. This control assures that the battery charger uses all the spare power available, to charge the battery, without exceeding the maximum power draw from the line. The battery converter is controlled at input 114 via line 105 from the microprocessor. The microprocessor may also operate a user display 117 to indicate to the user such things as the state of the battery charge and which element of the circuit is currently operating. Average power may also be displayed and manual user power limits may be input, if desired. The alarm 118 can indicate, as previously discussed, if there is inadequate battery charge to provide UPS services. The display 117 can also be used to indicate sudden changes in load performance, such as excessive power draws that might require adjustment upward or downward of the maximum allowable draw from the off-line converter. Remote power management 122 may also be employed to manage power from an energy management system that controls the overall energy demands. In the event the microprocessor is not employed it is desirable to install an alternate alarm, shown as 116 connected to the battery converter 99, such that when the battery converter is operating in the UPS mode, the user is notified, either by light or sound, that only a limited time is available before shutdown will be required.

Figure 7:
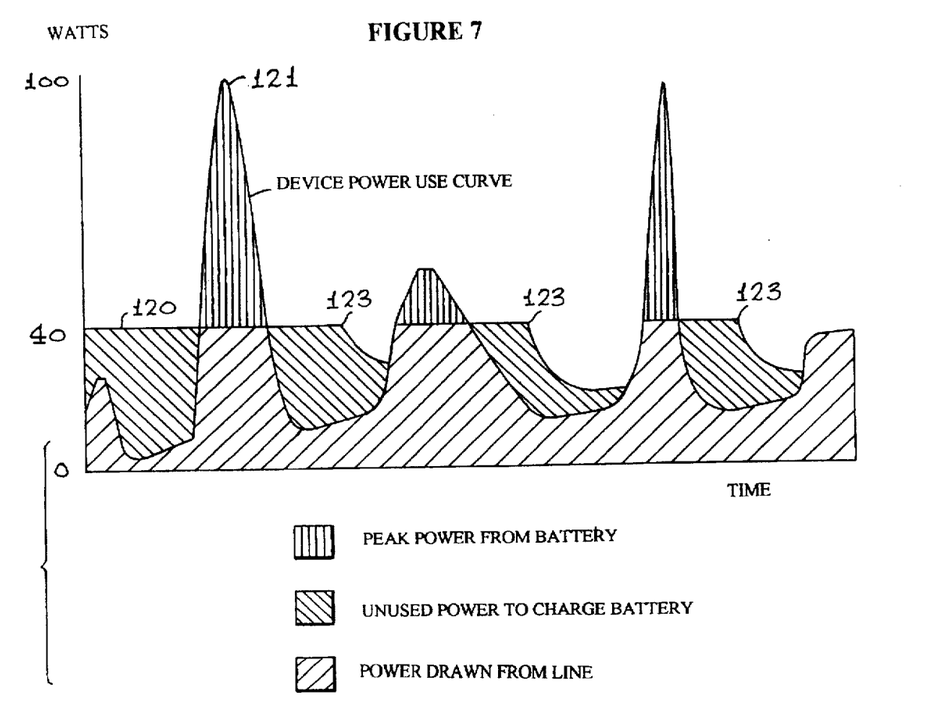
FIG. 7 is a graphic illustration of the operation of the demand control feature of the subject invention.

Referring now to FIG. 7, the device power use curve 120 shows what might typically be the load of office equipment, such as computers, monitors, printers, etc. For a normal office computer the load normally stays below the 40 watt line 120. As can be seen, whenever the device power use curve 121 is above the maximum line 120, the energy is supplied from the battery via the converter. When the device power use curve is below line 120 the power difference between the load's power draw and line 120 is used to recharge the batteries. In most cases not all this power would be needed to recharge the batteries and therefore the average power will drop below the 40 watt maximum, as shown at points 123, during some of the time. In the event of the use of the smarter system with a microprocessor, the 40 watt line can be adjusted upwards or downwards such that the average power drawn from the power line is only a few watts higher than the average power drawn by the computer. These few watts account for the inefficiency of charging and discharging the battery, which is very slight. The overall system would still be substantially more efficient than a computer with the standard UPS since the standard UPS has to convert the power from the battery back to AC with an additional inefficient power converting device.

While particular embodiments of the present invention have been shown and described, it will be obvious to someone skilled in the art that changes and modifications may be made without departing from this invention in its broader aspects and, therefore, the aim in the appended claims is to cover all such changes and modifications as fall within the true spirit and scope of this invention.

Intending to claim all novel features shown and described, the inventor claims as follows:

What is claimed is:

1. A power quality correction module comprising:

energy consuming equipment having an AC power supply with an AC line input and a normal storage capacitor;

a source of AC line power;

a rectification means connected to said source of AC line power to convert AC line power to an unfiltered pulsating direct current power;

a regulation and conversion circuit coupled to said rectification means to convert said unfiltered pulsating direct current power to a filtered and regulated direct current power output;

said regulation and conversion circuit of the boost type having a storage inductor and which produces a voltage variation of said unfiltered pulsating direct current rent power to modify said regulation and conversion circuit so that the current drawn from said unfiltered direct current power is in phase with, and directly proportional to, the voltage of said unfiltered pulsating direct current power;

a switching device coupled to one end of said regulation and conversion device and having a current sensing resistor means;

a first capacitor connected at the output of said rectification means to provide high frequency bypass and transient noise protection without providing any filtering of said output of said rectification means;

a second capacitor connected at the output of said regulation and conversion circuit to maintain an output voltage in the event of no load connection and to provide a voltage feedback for regulation;

driving logic connected to said switching device operating in response to the feedback of a combination of the voltage drop across said current sensing resistor means indicating the amount of current flowing in said switching device and storage inductor, and the voltage across said second capacitor at the output of said regulation and conversion circuit such that the switching of said switching device is modulated in an "on" and "off" condition at a high frequency to provide said regulated output;

a connection means from the unfiltered pulsating direct power to modulate said driving logic to allow for the said filtered and regulated direct current power output to be connected to an AC line input of a power supply for said energy consuming equipment as an alternative means of supplying power to said energy consuming equipment whereby said normal storage capacitor incorporated in said power supply supplies a voltage storage means to maintain a continuous direct current during the low power portion of a line frequency cycle of line power provided by said AC line power.

2. A power quality correction module according to claim 1 wherein:

the maximum amount of power supplied at the regulation and conversion circuit is limited to a predetermined amount.

3. A power quality correction module according to claim 1 wherein:

said regulation and conversion circuit is of a boost type comprising a storage inductor having two ends, one connected to said unfiltered pulsating direct current power;

a switching device having two poles with one pole connected to the other end of said storage inductor constituting a junction, the other pole of said switching device connected in series with a current sensing resistor means to the common of said unfiltered pulsating direct current power source;

a rectification means connected at said junction of said storage inductor and said switching device with the other end of which is connected to the second capacitor at the output of said regulation and conversion circuit;

a driving logic means connected to said switching device operating in response to a combination of the voltage drop across said current sensing resistor means, with said voltage feedback from the output of said regulation and conversion circuit and the said voltage signal of said unfiltered and pulsating direct current power such that the switching of said switching device is modulated in an "on" and "off" condition at a relatively high frequency to provide said filtered and regulated output.

4. A power quality correction module according to claim 3 wherein:

the value of said current sense resistor and said storage inductor is adjustable to limit the maximum amount of power supplied by said regulation and conversion means.

5. A power quality correction module according to claim 2 wherein:

a battery network having a battery connected between a battery charger circuit and a battery converter circuit;

the output of said battery converter circuit connected in parallel with the output of said regulation and conversion means;

said battery converter circuit activated to supply additional power when the power demand of said energy consuming equipment is greater than the power supplied by said regulation and conversion circuit.

6. A power quality correction module according to claim 5 wherein:

a microprocessor controller coupled to said battery charging circuit, said battery converter circuit and said regulation and conversion circuit;

said microprocessor controller adapted to average the average power drawn by said energy consuming equipment and to adjust the maximum output of said regulation and conversion circuit to said average power plus an additional amount of power to maintain said battery charged.

7. A power quality correction module according to claim 6 wherein:

circuit means connecting said microprocessor controller with said battery and said battery charger to monitor the charge placed on said battery and to cause said battery charger to keep said battery charged with the energy left over when said energy consuming equipment is consuming less power than the maximum allowable output of said regulation and conversion circuit.

8. A power quality correction module comprising:

energy consuming equipment having a conventional AC power supply with an AC line input, normal rectification means and a normal storage capacitor for filtering the output of said normal rectification means;

a source of AC line power;

a first rectification means connected to said source of AC line power to convert the AC line power to unfiltered pulsating direct current power;

a first capacitor connected at the output of said first rectification means to provide high frequency bypass and transient noise protection without providing any line frequency filtering of the output of said first rectification means;

a regulation and conversion circuit connected to said unfiltered pulsating direct current power to convert said unfiltered pulsating direct current power to a regulated direct current power output;

said regulation and conversion circuit being of the boost type comprising a storage inductor having two ends, one connected to said unfiltered pulsating direct current power the other end connected to a switching device;

said switching device having two poles that are electrically connected or not connected together depending on a signal applied to a third control input, with the first of the two poles connected to the junction of said other end of said storage inductor and a second rectification means, the second of the two poles of said switching device connected in series with a current sensing resistor to the common of said unfiltered pulsating direct current power source;

the second rectification means connected at said junction of said storage inductor and said switching device first pole is connected at its other end to a second capacitor which forms the output of said regulation and conversion circuit;

said second capacitor connected at the output of said regulation and conversion circuit large enough to maintain an output voltage in the event of no connection to said energy consuming equipment and to provide a voltage feedback for regulations;

driving logic connected to said third control input of said switching device operating in response to the feedback of a combination of the voltage drop across said current sensing resistor means, indicating the amount current flowing in said switching device and storage inductor, and the voltage across said second capacitor at the output of said regulation and conversion circuit such that the switching of said switching device is modulated in an "on" and "off" condition at a relatively high frequency to provide said regulated output;

a connection from the unfiltered pulsating direct current power to modulate the driving logic so that the current drawn from said unfiltered direct current power is in phase with, and directly proportional to the voltage of said unfiltered pulsating direct current power to maintain a high power factor and low harmonic content, a connection means to allow for the said regulated direct current power output to be connected to the AC line input of a conventional AC power supply for said energy consuming equipment as an alternative means of supplying power to said energy consuming equipment whereby said normal storage capacitor, incorporated within said conventional power supply, supplies a energy storage means to maintain continuous direct current during the low power portion of the line frequency cycle provided by said source of AC line power.

9. A power quality correction module according to claim 8 with the following additions:

a battery a DC/AC conversion circuit to convert the battery output voltage to an output voltage equal to that of said regulation and conversion circuit;

a connection means to allow for either or both the output of the battery boost circuit or the regulation and conversion circuit to supply the energy required to the energy consuming equipment this parallel connection allowing for the battery and boost portion of the circuit to supply power in the event of AC line power failure.

10. A power quality correction module according to claim 9 wherein;

the value of said current sense resistor and said storage inductor are selected such that the regulation and conversion circuit can only supply power up to a preset maximum limit forcing said battery and said DC/DC converter circuit to supply and additional power required by the energy consuming equipment.

11. A power quality correction module according to claim 10 wherein:

the energy not used by the said energy consuming equipment, when it draws less power than the said preset maximum limit, is used to charge said battery.

12. A power quality correction module according to claim 11 wherein: consuming equipment and adjust the maximum power allowed from the regulation and conversion circuit to maintain the total input power, including that needed to recharge the battery, to a fixed amount thus keeping the demand for power from said source of AC line power constant without the sudden surges and peaks that are normally required by the energy consuming equipment.

13. A power supply comprising;

energy consuming equipment having an AC power supply with an AC line input and a normal filter/storage capacitor.

a source of AC line power;

a first rectification means connected to said source of AC line power to convert the AC line power to unfiltered pulsating direct current power;

a first capacitor connected at the output of said first rectification means to provide high frequency bypass and transient noise protection without providing any line frequency filtering of the output of said first rectification means;

said regulation and conversion circuit being of the boost type comprising a storage inductor having two ends, one connected to said unfiltered pulsating direct current power the other end connected to a switching device;

said switching device having two poles that are electrically connected or not connected together depending on a signal applied to a third control input, with the first of the two poles connected to the junction of said other end of said storage inductor and a second rectification means, the second of the two poles of said switching device connected in series with a current sensing resistor to the common of said unfiltered pulsating direct current power source;

the said second rectification means connected at said junction of said storage inductor and said switching device first pole is connected at its other end to a second capacitor which forms the output of said regulation and conversion circuit;

the said second rectification means connected at said junction of said storage inductor and said switching device first pole is connected at its other end to a second capacitor which forms the output of said regulation and conversion circuit;

said second capacitor connected at the output of said regulation and conversion circuit large enough to maintain an output voltage in the event of no connection to said energy consuming equipment and to provide a voltage feedback for regulation;

driving logic connected to said third control input of said switching device operating in response to the feedback of a combination of the voltage drop across said current sensing resistor means, indicating the amount current flowing in said switching device and storage inductor, and the voltage across said second capacitor at the output of said regulation and conversion circuit such that the switching of said switching device is modulated in an "on" and "off" condition at a relatively high frequency to provide said regulated output;

a connection from the unfiltered pulsating direct current power to modulate the driving logic so that the current drawn from said unfiltered direct current power is in phase with, and directly proportional to the voltage of said unfiltered pulsating direct current power to maintain a high power factor and low harmonic content;

the value of said current sensing resistor and said storage inductor are selected such that the regulation and conversion circuit can only supply power up to a preset maximum limit forcing said battery and said DC/DC converter circuit to supply any additional power required by the energy consuming equipment, one or more DC/DC conversion circuits to convert the output of said regulation and conversion circuit to the various DC voltages by the energy consuming equipment into which it is supplying power;

a battery;

a DC/DC conversion circuit to convert the battery output voltage to an output voltage equal to that of said regulation and conversion circuit;

a connection means to allow for the output of either the battery boost circuit or the regulation and conversion circuit such that either or both may supply the energy required to the energy consuming equipment this parallel connection allowing for the battery and boost portion of the circuit to supply power in the event of AC line power failure;

the energy not used by the said energy consuming equipment when it draws less power than the said preset maximum limit, is used to charge said battery.

14. A power quality correction module according to claim 12 wherein:

a microprocessor is incorporated to analyze the average power consumed by the energy consuming equipment and adjust the maximum power allowed from the regulation and conversion circuit to maintain the total input power, including that needed to recharge the battery, at a fixed amount thus keeping the demand for power from the source of AC power constant without the sudden surges and peaks that are required by the energy consuming equipment.

* * * * *